July 8, 1941.    E. B. LEAR    2,248,882

FASTENER

Filed Jan. 16, 1940

INVENTOR
EARL B. LEAR
BY
ATTORNEY

Patented July 8, 1941

2,248,882

UNITED STATES PATENT OFFICE 2,248,882

FASTENER

Earl B. Lear, Garfield Heights, Ohio, assignor to The Cleveland Pneumatic Tool Company, Cleveland, Ohio, a corporation of Ohio Application January 16, 1940, Serial No. 314,137

12 Claims. (Cl. 85—5)

This invention relates to fasteners for temporarily holding together perforated plates or sheets in perforated alignment preparatory to the riveting thereof.

One object of this invention is to produce a fastener or temporary rivet which may be readily applied to or removed from the work, and constituting a simple assembly which is strong, durable and efficient.

Another object of this invention is to produce an improved fastener capable of securing perforated sheets together while assuring the perfect alignment of the perforations thereof.

Another object of this invention is to produce a temporary rivet which may be applied to and removed from the work from only one side thereof, thereby eliminating the assistance of another workman on the opposite side of the work.

Other objects and advantages more or less ancillary to the foregoing reside in the specific construction and aggroupment of the elements peculiar to this structure, as will become apparent from a more complete examination of this specification.

In the drawing which illustrates the invention:

Figure 1:
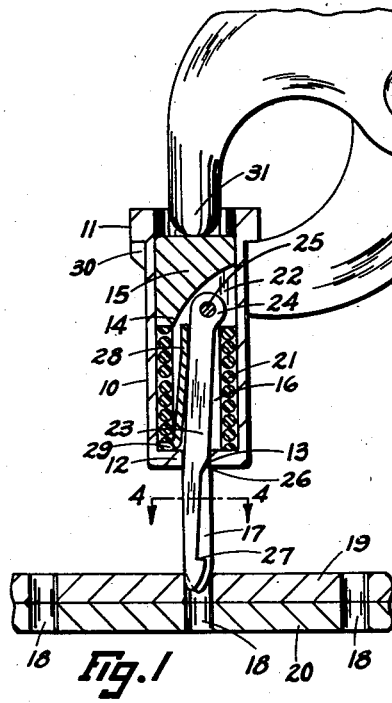
Fig. 1 is a side cross-sectional view of the improved fastener together with a portion of the tool with which the fastener is applied to or removed from the work. In this view, the fastener is shown in the position assumed during the first step of its application to the work.
Figure 4:
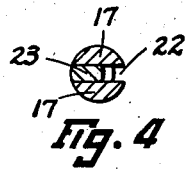
Fig. 4 is an enlarged cross sectional view taken through a plane indicated by line 4—4 in Fig. 1.

Referring to the drawing in which like symbols designate corresponding parts throughout the several views, 10 represents a cup shaped cylindrical housing formed at its upper end with an external upper annular flange 11, and having its lower end formed by a cross wall or base 12 having a cylindrical center bore 13 extending therethrough. Slidable in the housing 10, there is a rod 14 of differential diameters forming a head 15 fitting closely within the housing 10 for slidable movement therein, a centrally reduced portion 16, and a small extreme end portion 17 fitted closely within the bore 13 of the housing base 12 for slidable movement therethrough. The diameter of this last portion 17 is calculated to be about equal or slightly smaller than that of the perforations or rivet holes 18 provided through the work represented in the drawing by upper and lower sheets 19 and 20. Interposed between the head 15 of the rod 14 and the base 12 of the housing 10, there is a compression spring 21 constantly urging the rod upwardly relative to the housing 10. For a major portion of its length, the rod 14 is provided with a central slot 22 ending in the head 15, within which slot is swingably mounted a flat latch 23 provided with a head 24 pivotally connected to the head 15 of the rod 14 by a cross pin 25. For the portion of the latch below its head 24, the width thereof is substantially equal to or somewhat smaller than the diameter of the bore 13 and consequently of the rod's reduced portion 17. The lower end portion of the latch 23 is reduced in width to form toward the upper end thereof an inclined side wall or cam 26, and toward the lower end a straight lateral projection or step 27 located below the housing for engagement with the under side of the lower sheet 20 in a manner hereinafter described. Also located within the slot 22 of the rod 14, there is a narrow leaf spring 28 having one end resting against the side of the latch 23 opposed to the cam 26, and its other end 29 bent at substantially right angle and seated on the housing base 12 under the compression spring 21.

The temporary rivet or fastener is applied to the work by using a plierlike tool having a jaw 30 engaging the under side of the annular flange 11 of the housing 10, and another jaw 31 engaging the extreme upper end of the rod 14. Upon the movement of the two jaws toward each other, the rod 14 will be forced into the housing 10 against the action of the compression spring 21 until the lower end of the middle portion 16 engages the base 12 of the housing 10, thereby causing the lateral projection 27 of the latch 23 to be moved away from the housing base 12. During this downward movement of the rod, the cam 26 of the latch 23 will engage the base 12 of the housing 10, thereby causing swinging movement of the latch against the effort of the leaf spring 28, thus resulting in the lateral projection or step 27 to be moved into the peripheral limit of the rod's smallest portion 17 and thereby enabling the latch together with that portion of the rod to be inserted through aligned perforations 18 of the sheets 19 and 20.

Upon releasing the pressure exerted on the annular shoulder 11 of the housing 10 and the head 15 of the rod 14, the compression spring 21 active between the head 15 of the rod 14 and the base 12 of the housing 10 will cause the rod to move upwardly relative to the housing. In this instance, the cam 26 of the latch 23 will be moved away from the housing base 12, thereby enabling, through the action of the leaf spring 28, the latch to swing laterally in a counterclockwise direction in Fig. 1 to position the lateral projection 27 outside of the circumferential limit of the rod's reduced portion 17. In other words, upon upward movement of the rod and consequently of the latch 23, the latch is free to swing into engagement of its lateral projection 27 with the under side of the lower sheet 20. Due to the action of the compression spring 21 on the rod 14, the lateral projection 27 of the latch 23 will of course be moved upwardly toward the housing 10, thereby causing the clamping of the two sheets against each other between the projection 27 and the housing base 12. Since the diameter of the rod's reduced portion 17 is substantially equal to that of the perforation 18, it will serve as a guiding means for maintaining the perforation in perfect alignment, while the latch 23 or more particularly its lateral projection 27 together with the housing 10 serves as jaw means for clamping the work therebetween by the action of the compression spring 21.

When it is desired to remove the fastener from the work, the compression spring 21 may again be deflected by applying the jaws 30 and 31 of the plierlike tool to the flange 11 of the housing 10 and head 15 of the rod 14. Upon downward movement of the rod, the cam 26 of the latch 23 will again engage the base 12 of the housing and shift the lateral projection 27 into the peripheral limit of the rod's reduced portion 17, thereby enabling removal of the device from the work while maintaining the lateral projection 27 inside of the rod's reduced portion 17.

Figure 3:
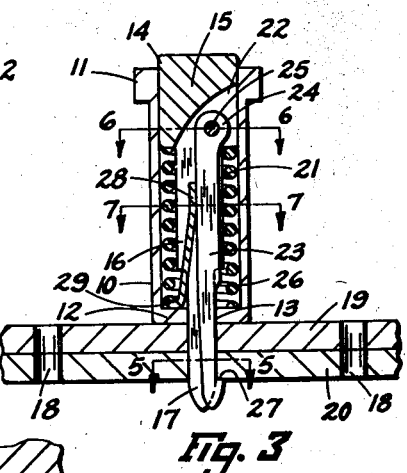
Fig. 3 is a view similar to Fig. 1 illustrating the fastener in operative position.
Figure 2:
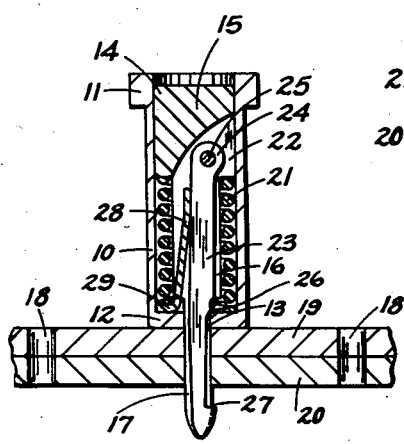
Fig. 2 is a view similar to Fig. 1 illustrating the position assumed by the fastener during the second step of its application to the work.
Figure 5:
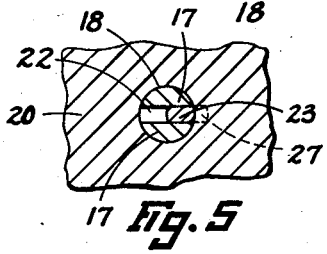
Fig. 5 is an enlarged cross sectional view taken in a plane indicated by line 5—5 in Fig. 3.
Figure 6:
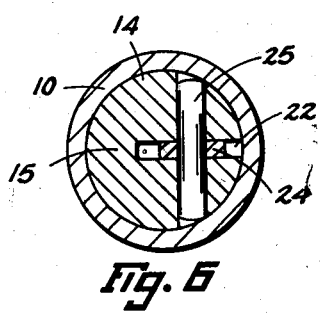
Fig. 6 is an enlarged cross sectional view taken in a plane indicated by line 6—6 in Fig. 3.
Figure 7:
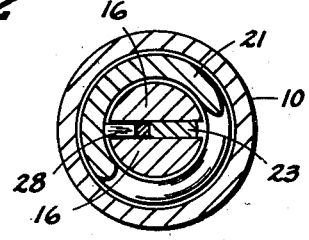
Fig. 7 is an enlarged cross sectional view taken in a plane indicated by line 7—7 in Fig. 3.

From the foregoing explanation, it will be understood that the lateral or swinging movement of the latch 23 or more particularly of its lateral projection 27, is the direct result of the axial slidable movement of the rod 14 or latch 23 relative to the housing 10. The lateral projection 27 being substantially parallel to the under face of the work, the small side thrust of the leaf spring 28 on the latch 23 is sufficient to maintain the latch in operative engagement with the work upon the action of the compression spring 21 on the rod's head 15 as shown in Fig. 3.

Although the foregoing is necessarily of a detailed character, in order to completely set forth the invention, it is to be understood that the use of spring means other than the leaf spring 28 effecting the swinging motion to the latch 23 in one direction, as well as variations from the general disposition of the elements or rearrangements of parts, may be resorted to without departing from the scope or spirit of the invention as herein claimed.

I claim:

1. A fastener for temporarily holding together at least two superposed perforated sheets, including a housing member adapted to rest on the upper sheet, a slidable rod extending through said member insertable through aligned perforations of said sheets for maintaining them in aligned position, a latch pivotally mounted in said rod for slidable movement therewith, a lateral projection on said latch insertable with said rod through said aligned perforations, said projection being movable into or out of operative engagement with the under sheet upon pivotal movement of said latch in one or the other direction, means responsive to the slidable movement in both directions of said latch for effecting its pivotal movement, and spring means active between said housing member and rod for clamping the sheets between said member and the lateral projection of said latch.

2. A fastener for temporarily holding together at least two superposed perforated sheets, including a member adapted to rest on the upper sheet, a slidable rod extending through said member insertable through aligned perforations of said sheets for maintaining them in alignment, a latch mounted in said rod for slidable movement therewith, a lateral projection on said latch, spring means active on said latch for normally maintaining said projection out of the circumferential limit of said rod to enable its engagement with the under sheet, cam means responsive to the slidable movement of said latch in one direction for moving said projection within the circumferential limit of said rod to enable its insertion through said aligned perforations, and means active between said member and latch for clamping the sheets between said member and the projection of said latch.

3. In a fastener for temporarily holding together at least two superposed perforated sheets, a member adapted to rest on the upper sheet, perforation aligning means depending from said member insertable into the perforations of said sheets, a latch slidable through said member capable of swinging motion within a plane perpendicular to said sheets, said latch being formed with a lateral projection below said member insertable through said perforations and movable into or out of the circumferential limits thereof upon swinging motion of said latch, means responsive to the slidable movement of said latch for effecting its swinging motion, and spring means active on said latch urging said projection toward said member.

4. A fastener for temporarily holding together at least two superposed perforated sheets, including a member adapted to rest on the upper sheet, perforation aligning means depending from said member insertable into aligned perforations of said sheets for engagement with at least two diametrically opposed sides of said perforations, an element movable into or out of engagement with the under sheet slidable relative to said member through aligned perforations of said sheets, means responsive to said slidable movement for moving said element into or out of engagement with said under sheet, and means active between said member and element for clamping the sheets therebetween.

5. In a fastener for temporarily holding together at least two perforated sheets, a member adapted to rest on the upper sheet, a latch mounted in said member for slidable movement relative thereto, said latch having one end portion protruding from said member capable of lateral motion relative thereto in two directions, a lateral projection on said one end portion insertable through aligned perforations of said sheets and engageable with the underside of the lower sheet upon lateral movement of said end portion in one direction, means responsive to the slidable movement of said latch for effecting lateral movement of said one end portion in both directions, and perforation aligning means depending from said member longitudinally extending on both sides of said latch for insertion into said aligned perforations.

6. In a device of the character described, a rodlike element, a laterally projecting wall on said element, a member slidable through said wall swingable in a plane perpendicular to said wall, a lateral projection on said member movable into or out of the peripheral limit of said element upon swinging motion of said member and means responsive to the slidable movement of said member in both directions for automatically effecting its swinging motion.

7. In a device of the character described, a rodlike element, a laterally projecting wall on said element axially slidable relative thereto, a lateral projection on said element below said wall swingable in a plane perpendicular to said wall into or out of the peripheral limit of said element, and means responsive to the relative slidable movement between said wall and element in both directions for automatically effecting the swinging movement of said projection.

8. In a fastener for temporarily holding together at least two superposed sheets, a member adapted to rest on the upper sheet, a rod slidable through said member into aligned perforations of said sheets for maintaining them in alignment, an element carried by said rod for slidable movement therewith and engageable with the under sheet, spring means responsive to the slidable movement of said rod in one direction for moving said element into operative position relative to said under sheet, and means responsive to the slidable movement of said rod in the other direction for moving said element out of operative position.

9. In a fastener for temporarily holding together at least two superposed sheets, a member adapted to rest on the upper sheet, a rod slidable through said member into aligned perforations of said sheets for maintaining them in alignment, an element carried by said rod for slidable movement therewith and engageable with the under sheet, spring means responsive to the slidable movement of said rod in one direction for moving said element into operative position relative to said under sheet, means responsive to the slidable movement of said rod in the other direction for moving said element out of operative position, and spring means active between said member and rod for clamping the sheets between said member and element.

10. In a fastener for temporarily holding together at least two perforated sheets, a member adapted to rest on the upper sheet, a latch mounted on said member for slidable and pivotal movement relative thereto, said latch being formed with a lateral projection insertable through aligned perforations of said sheets and movable into or out of engagement with the under sheet upon pivotal movement of said latch, means responsive to the slidable movement of said latch in one direction for effecting its pivotal movement into engagement and in the other direction out of engagement with the under sheet, and perforation aligning means on both sides of said latch insertable into aligned perforations of said sheets.

11. In a device of the class described, a pivotal latch formed with a lateral projection adjacent one end thereof, a projecting member extending laterally of said latch and slidable with respect thereto at least up to said projection, perforation aligning means depending from said member and extending longitudinally on both sides of said latch, said projections being capable of extending laterally from said perforation aligning means upon the pivotal movement of said latch, and means responsive to the slidable movement between said member and latch for effecting said pivotal movement in one or the other direction.

12. In a device of the character described, a rodlike element, a member through which said element may slide extending laterally of the element, means carried by said element below said member capable of lateral movement into or out of the peripheral limit of said element, and means responsive to the slidable movement of said element relative to said member for effecting said lateral movement in one or the other direction.

EARL B. LEAR.